(12) United States Patent
Taylor

(10) Patent No.: US 9,230,755 B2
(45) Date of Patent: Jan. 5, 2016

(54) SWITCH ASSEMBLY FOR A MOBILE DEVICE

(71) Applicant: Joseph Taylor, Seattle, WA (US)

(72) Inventor: Joseph Taylor, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

(21) Appl. No.: 13/918,817

(22) Filed: Jun. 14, 2013

(65) Prior Publication Data

US 2014/0367237 A1    Dec. 18, 2014

(51) Int. Cl.
*H01H 15/02* (2006.01)
*H01H 15/00* (2006.01)
*H01H 15/06* (2006.01)
*H04M 1/23* (2006.01)
*H01H 25/00* (2006.01)

(52) U.S. Cl.
CPC .............. *H01H 15/02* (2013.01); *H01H 15/005* (2013.01); *H01H 15/06* (2013.01); *H04M 1/236* (2013.01); *H01H 2025/004* (2013.01)

(58) Field of Classification Search
CPC ....... H05K 7/00; H01H 15/02; H01H 15/005; H01H 15/06
USPC ....... 200/5 A, 16 C, 5 R, 17 R, 520, 547, 341
See application file for complete search history.

(56) References Cited

U.S. PATENT DOCUMENTS

| 5,038,004 A * | 8/1991 | Ohashi ................. 200/16 C |
| 8,319,135 B2 | 11/2012 | Chen et al. |
| 2008/0088489 A1 | 4/2008 | Moon |
| 2009/0223795 A1 | 9/2009 | Lee et al. |
| 2009/0323260 A1 | 12/2009 | Son et al. |
| 2010/0039299 A1* | 2/2010 | Yang et al. ................ 341/22 |
| 2010/0197342 A1 | 8/2010 | Lee |
| 2011/0098833 A1 | 4/2011 | Seflic et al. |

FOREIGN PATENT DOCUMENTS

| CN | 202141982 U | 2/2012 |
| EP | 0817446 A2 | 1/1998 |
| JP | 2009176713 A * | 8/2009 |

OTHER PUBLICATIONS iPhone OS 3.1 User Guide, Apple Inc. Published in Sep. 2009, p. 54.*
APEM Tact Switch Drawing (AMPTFVTR) Rev. A. APEM. Published on Jul. 31, 2006, p. 1.*
Flexible Electronics article, Wikipedia. Published on Dec. 13, 2011.*
(Continued)

*Primary Examiner* — Edwin A. Leon
*Assistant Examiner* — Iman Malakooti
(74) *Attorney, Agent, or Firm* — Judy Yee; Micky Minhas

(57) ABSTRACT

A switch assembly for an electronic device comprises a switch mount and a keycap. The switch mount has a slide switch with a slide switch base and a slide switch actuator. The keycap is positionable for slidable movement relative to the switch mount and is coupleable to the slide switch actuator. The keycap has an exposed portion slidable by a user between at least a first position and a second position to execute a first control function. The keycap is depressible in at least one of the first and second positions to execute a second control function.

10 Claims, 21 Drawing Sheets

(56) References Cited

OTHER PUBLICATIONS

"International Search Report and Written Opinion issued for PCT Patent Application No. PCT/US2014/041607", Mailed Date: Nov. 21, 2014, 24 Pages.

"Second Written Opinion Issued in PCT Application No. PCT/US2014/041607", Mailed Date: Jun. 17, 2015, 12 Pages.

"International Preliminary Report on Patentability Issued in PCT Patent Application No. PCT/US2014/041607", Mailed Date: Sep. 14, 2015, 14 Pages.

* cited by examiner

SWITCH ASSEMBLY FOR A MOBILE DEVICE

BACKGROUND

This application relates to controls for electronic devices, and more specifically to a dual-mode switch usable in a mobile device.

As mobile devices increase in complexity, new approaches to providing users with control over their devices in multiple modes of operation are needed. The current array of hardware buttons, switches and other controls on the face and sides of a mobile device fulfills many requirements, but users still fumble, miss connections, have embarrassing moments and lose productivity because they cannot quickly execute a simple operation to control the device's behavior. This is especially true while users are attempting to control their devices while on the go or preoccupied with other activities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described below are implementations of a new switch assembly for a mobile device that addresses some of the problems in conventional mobile device controls.

According to one implementation, a switch assembly for an electronic device comprises a switch mount and a keycap. The switch mount has a slide switch with a slide switch base and a slide switch actuator. The keycap is positionable for slidable movement relative to the switch mount and is coupled to the slide switch actuator. The keycap has an exposed portion slidable by a user between at least a first position and a second position to execute a first control function. The keycap is depressible in at least one of the first and second positions to execute a second control function.

The first and second ends of the keycap can be depressible when the keycap is positioned in only one of the first position and the second position.

The switch mount can comprise a support element having first and second spring portions and first and second contact switches alignable with respective first and second ends of the keycap, wherein the first and second ends of the keycap are depressible against the action of the first and second spring portions to actuate the first and second contact switches, respectively.

The electronic device can be a mobile device, and wherein the first switch function can be a mute control and the second switch function can be a volume level control.

The keycap can be shaped for positioning its exposed portion to protrude through an opening in a housing of the electronic device.

The switch mount assembly can comprise a flexible circuit component shaped for electrically connecting the slide switch to a circuit of the electronic device. The switch mount assembly can comprise first and second contact switches connected to the flexible circuit component, and wherein the slide switch is positioned between the first and second contact switches.

The exposed portion of the keycap can comprise a visual indicator in at least one of the first position and the second position. The support element can be made of a metal. The keycap assembly can comprise bearings positionable in sliding contact with the slide switch mount.

A mobile device can comprise a dual-mode switch with a switch member configured to slide between at least two positions to execute a first mode control function, the switch member being depressible in at least one of the two positions to execute a second control function.

In one implementation, when the switch member is in the first position, selected audio output of the mobile device can be muted. In another implementation, when the switch member is in the second position, selected audio output of the mobile device can be unmuted. The second control function can comprise changing a volume level for selected audio output of the mobile device.

In one implementation, when the switch member is in the first position selected audio output of the mobile device is muted, wherein when the switch member is in the second position, selected audio output of the mobile device is unmuted, and wherein when the switch member is in the second position, depressing the switch member changes a volume level for audio output of the mobile device.

The mobile device can be configured such that depressing the switch member while the switch member is in the first position does not execute any control function, or depressing the switch member while the switch member is in the first position executes a control function other than changing the volume level.

The switch element can be configured to be mechanically blocked from being depressed when the switch member is in the first position. The switch element can be configured such that depressing one end of the switch member can increase the volume level and depressing the opposite end of the switch member can decrease the volume level.

The foregoing and other objects, features, and advantages will become more apparent from the following detailed description, which proceeds with reference to the accompanying figures.

DETAILED DESCRIPTION

Described below are embodiments of a switch assembly for an electronic device, such as for a mobile device. The switch assembly is capable of functioning in at least two modes. In a first mode, there is a slide element that can be slid between at two positions to execute a first switching operation. In a second mode, a portion of the slide element, such as one or both of its ends, can be moved, such as by depressing it or rocking it, to execute a second switching operation.

Figure 1:
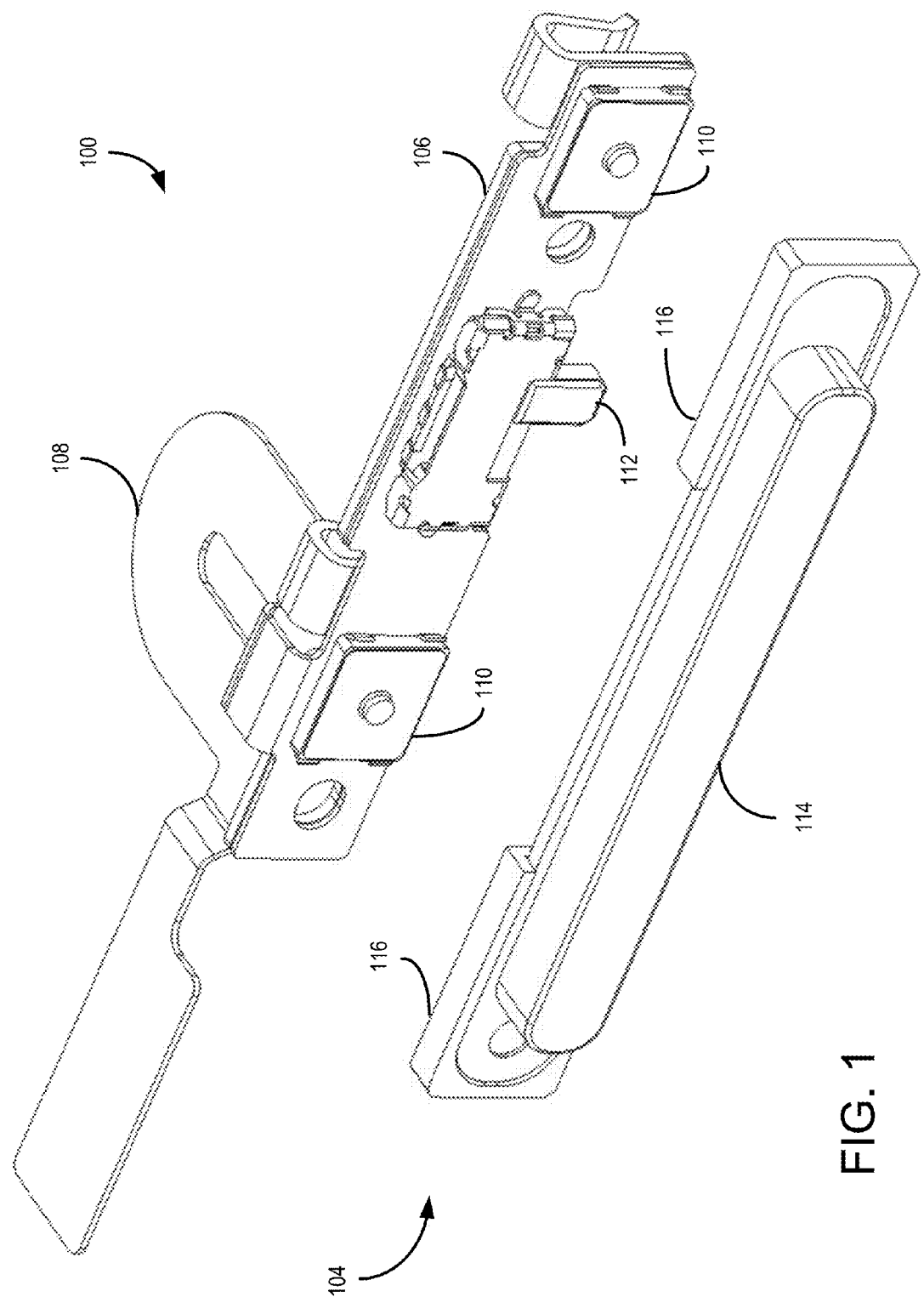
FIG. 1 is an exploded perspective view of an exemplary switch assembly from a first side.

FIG. 1 is an exploded perspective view of a representative switch assembly 100 according to one implementation. As shown, there is a first portion or subassembly that is generally housed internally within an electronic device and is referred to as the internal assembly 102. There is a second portion or subassembly, referred to as the keycap assembly 104, that is operatively coupled to the internal subassembly 102 and has an exposed switch element, i.e., the keycap 114, by which a user executes switching and/or other control operations.

The internal assembly 102 in the illustrated implementation includes a support element, such as spring stiffener 106, that provides support for a FPC (flexible printed circuit) member 108, at least one surface mount (SMT) switch 110 and a slide switch 112. Thus, the internal assembly can also be referred to as a switch mount.

Figure 9:
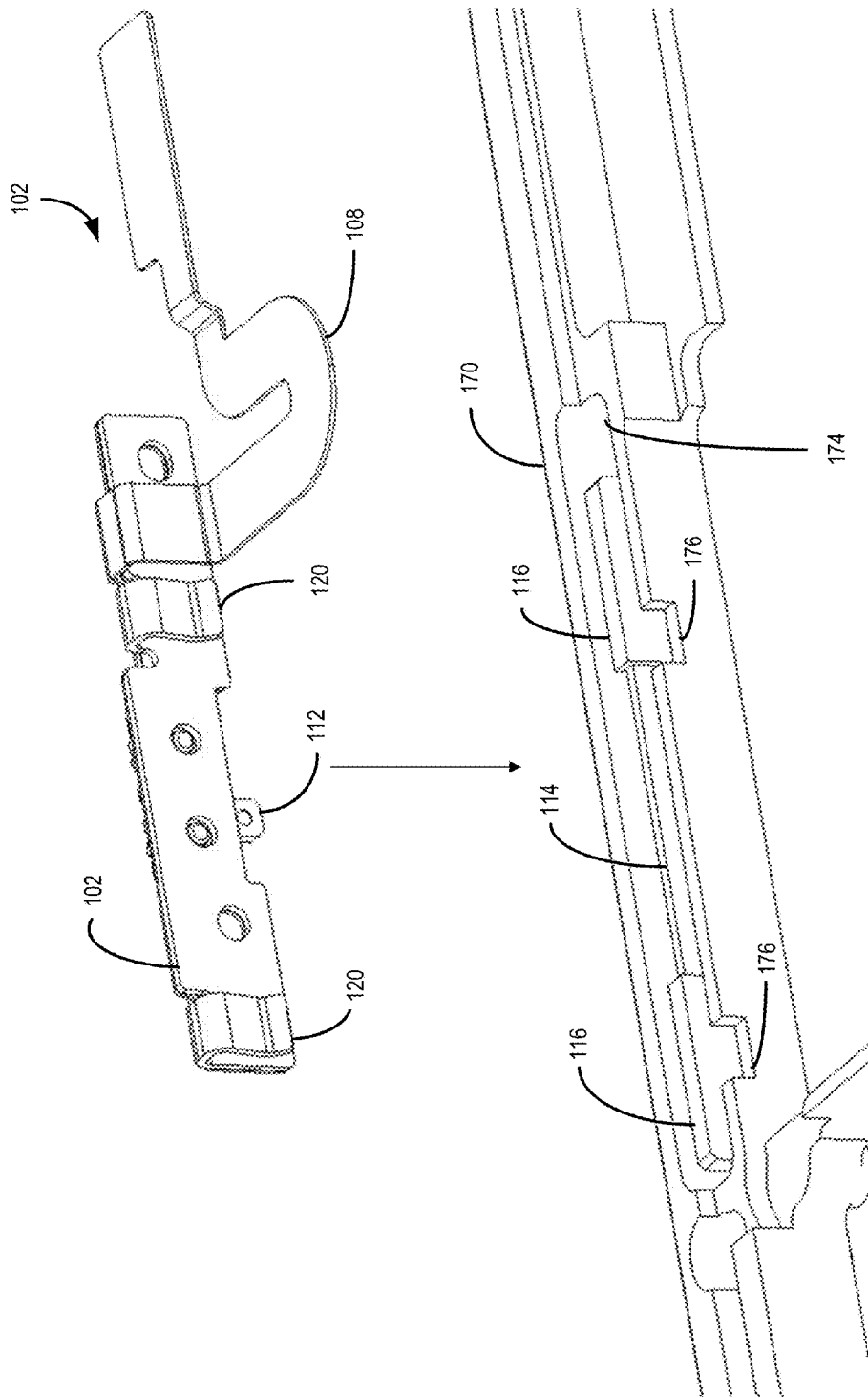
FIG. 9 is a perspective view of the portion of the switch assembly of FIGS. 3 and 4 being assembled into the housing of the electronic device.

In the illustrated implementation, there are two surface mount contact switches 110, and the slide switch 112 is positioned between them. The surface mount switches 110 and the slide switch 112 are mounted to the FPC member 108, which serves to establish an electrical connection to one or more circuits of the electronic device. More precisely, the surface mount switches 110 and the slide switch 112 each have a respective base that is stationarily mounted and a movable switch actuating element. As will be described below in greater detail, FIG. 9 shows that the spring stiffener 106 is configured to secure the internal assembly 102 to a wall or other structure within the electronic device.

Figure 7A:
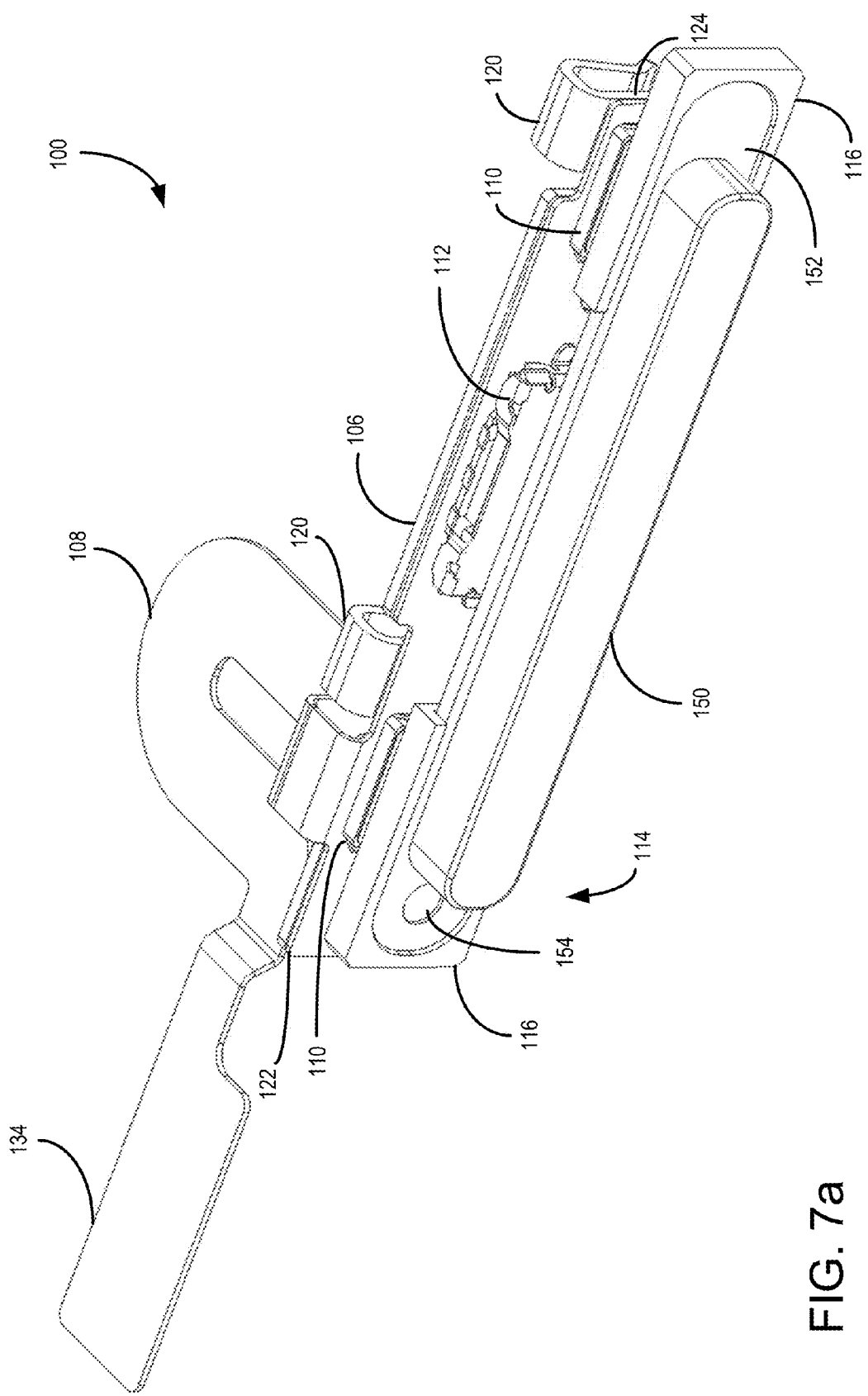
FIG. 7a is a perspective view of the assembled switch assembly of FIG. 1.
Figure 7B:
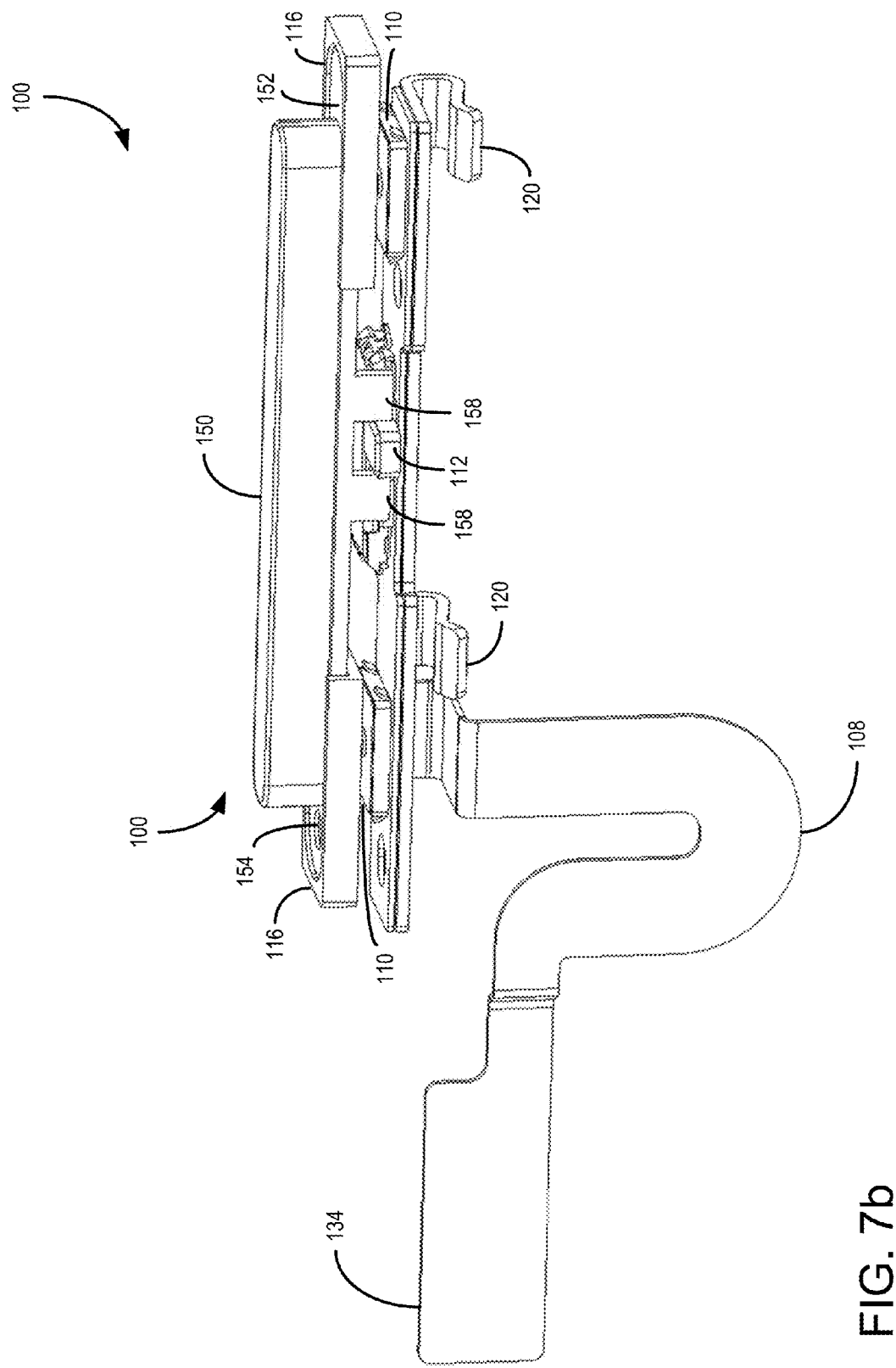
FIG. 7b is another perspective view of the assembled switch assembly of FIG. 1.

In addition to the keycap 114, the keycap assembly 104 in the illustrated implementation comprises slide bearings 116 configured for positioning very close to or minimally contacting the surface mount switches 110 and lowering friction as the keycap 104 is slid back and forth or translated between positions. When the keycap 104 is simply translated, the surface mount switches 110 are not actuated. One or more guide members on the keycap 104, such as the guide members 158 shown in FIGS. 7a and 7b, are positioned to be coupled with the slide switch 112 and to slide it between positions as the keycap is translated. In the illustrated implementation, the guide members 158 are positioned on either side of the switching element of the slide switch 112.

Figure 2:
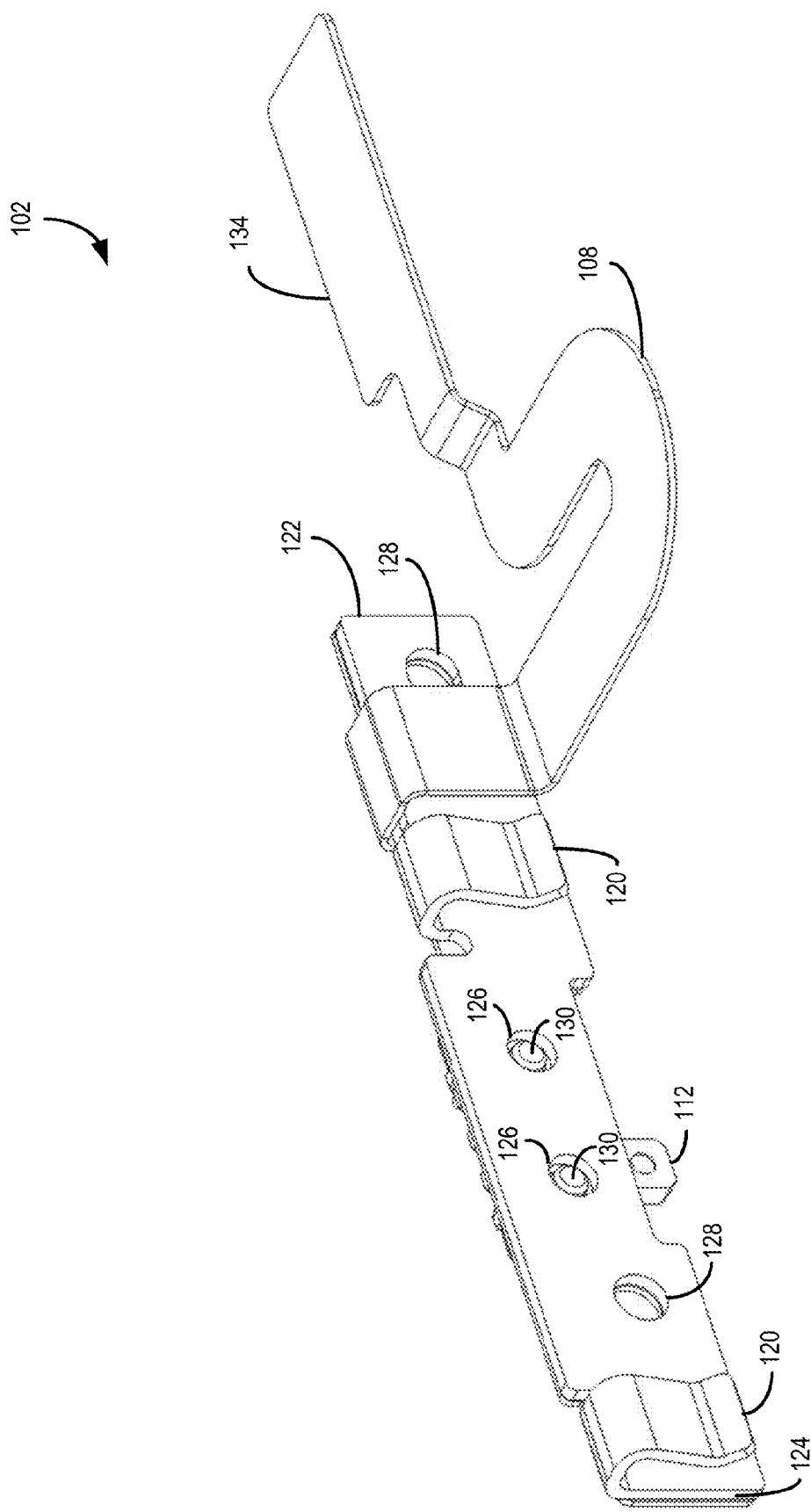
FIG. 2 is a perspective view of a portion of the switch assembly of FIG. 1, including a flexible printed circuit component, from a second side.

FIG. 2 shows the internal assembly 102 from the opposite side as is shown in FIG. 1. There is a pair of spring elements 120 formed in the spring stiffener 106 and positioned in general alignment with the pair of surface mount switches 110. As can be seen in FIG. 1, one of the switches 110 (nearer a second end 124) is more directly aligned with its corresponding spring element 120 than the other nearer a first end 122. Depending upon the specific application and the desired spring action, the alignment between each switch 110 and its spring element 120 can be set as desired. In the illustrated implementation, the spring elements 120 and the spring stiffener 106 are formed of a metal, but any material providing sufficient strength and resiliency can be used.

As best shown in FIG. 2, the slide switch 112 can have one or more alignment features 130 that protrude through corresponding openings 136 (FIG. 3) in the FPC member 108 and are received in openings 126 in the spring stiffener 106. The spring stiffener 106 can also have fastener apertures 128 for receiving fasteners, such as threaded fasteners (not shown), that secure the assembly 102 to the electronic device. The FPC member 108 has an attached portion 132 that is generally in contact with the spring stiffener 106 and a free portion that is flexible and shaped to allow relative movement of various components, such as during assembly and/or repair.

Figure 3:
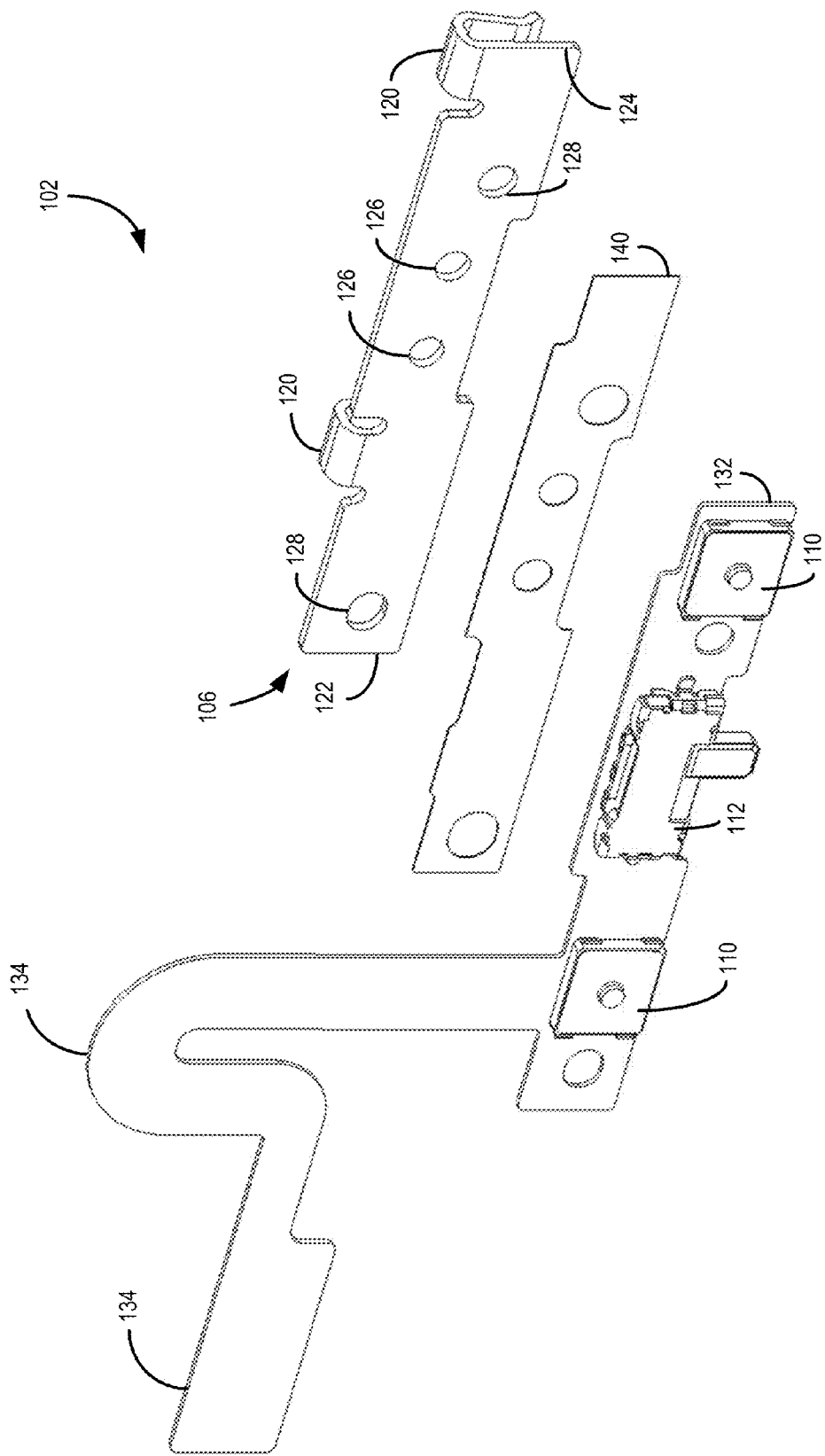
FIGS. 3 and 4 are exploded perspective views from different sides of the portion of the switch assembly shown in FIG. 2.
Figure 4:
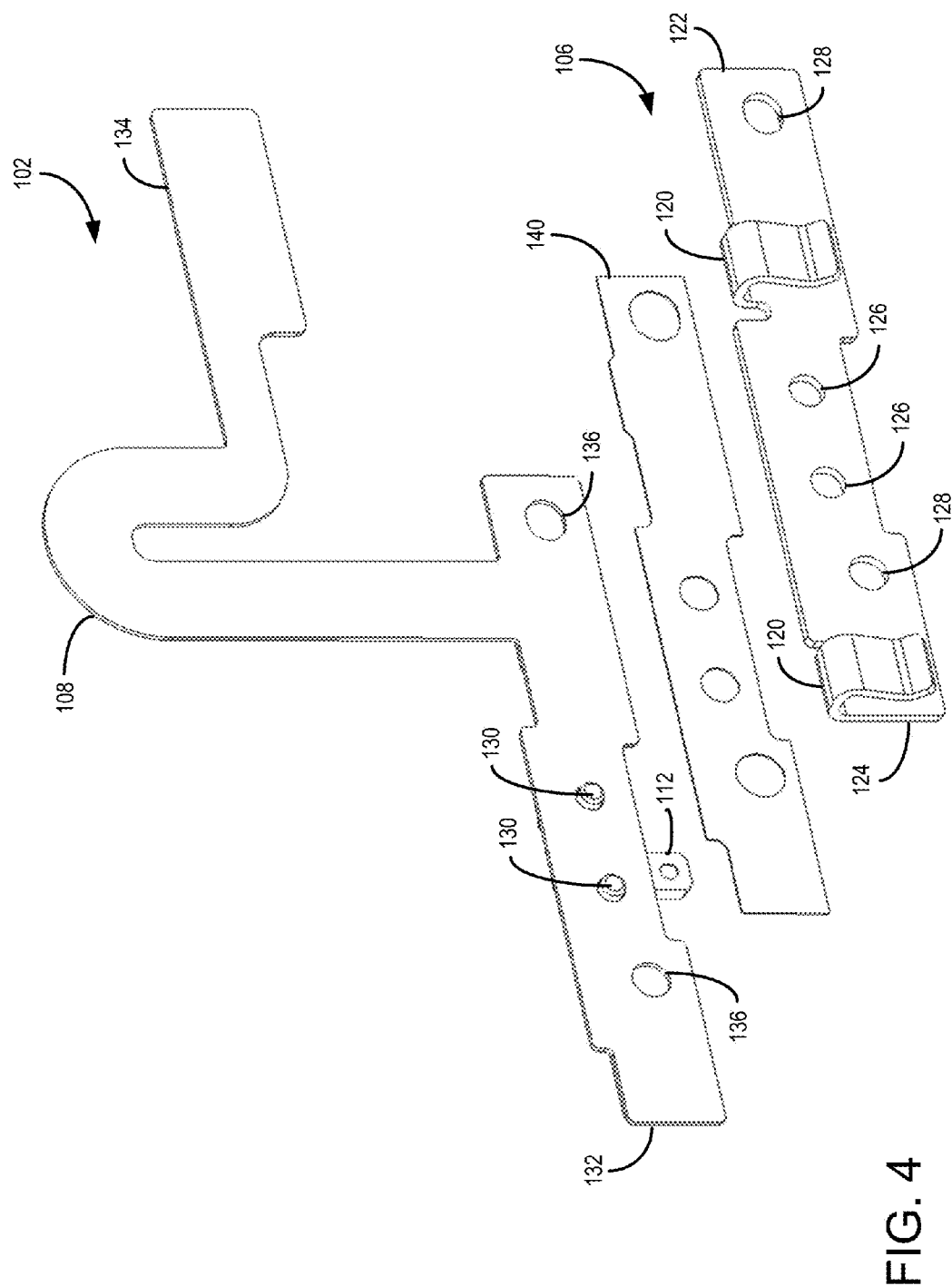

FIGS. 3 and 4 are additional exploded perspective views showing the internal assembly 102, and in particular, how the FPC member 108 can be attached to the spring stiffener 106 with adhesive, which is represented by the adhesive layer 140. In the illustrated implementation, a PSA adhesive is used.

Figure 5:
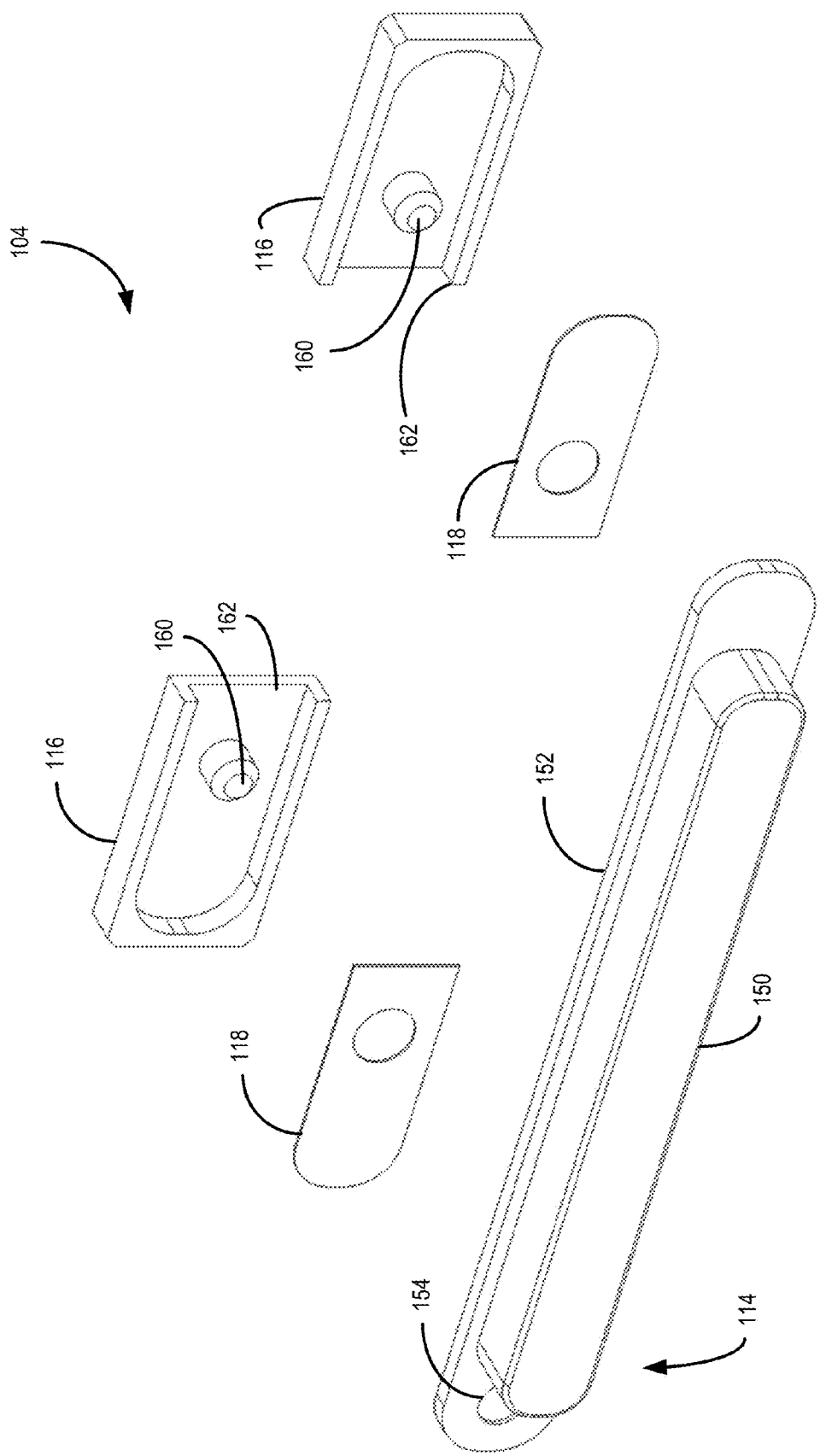
FIGS. 5 and 6 are exploded perspective views from different sides of the keycap assembly of the switch assembly of FIG. 1.
Figure 6:
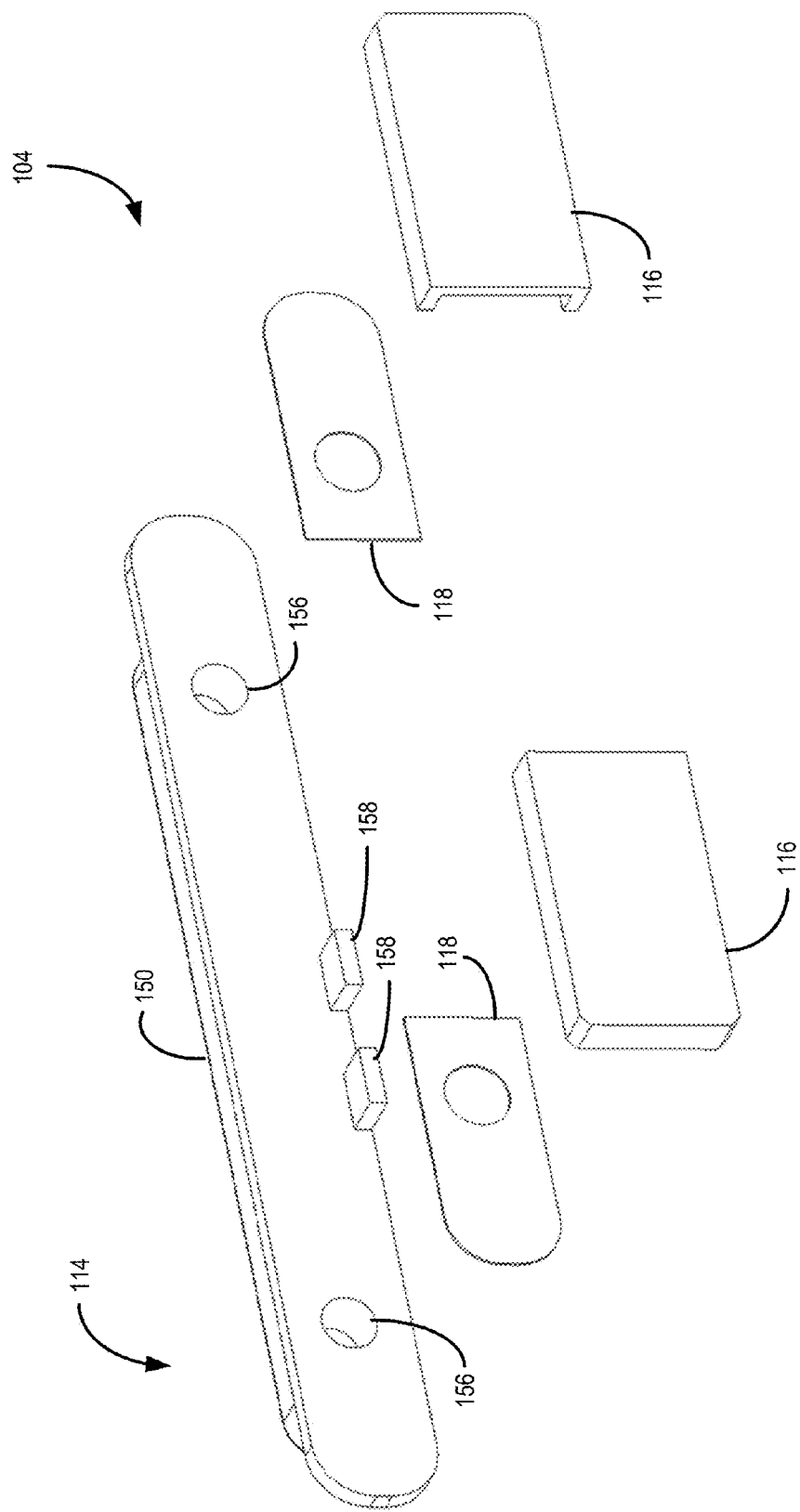

FIGS. 5 and 6 are additional exploded views of the keycap assembly 104. The keycap 114 has a raised portion 150 that forms the exposed portion of the switch assembly that the user manipulates. Surrounding the raised portion 150 is a flange 152 that serves to retain the keycap 114 within an opening of a housing of the electronic device and to guide it during movement. An indicator, such as the indicator 154, can be provided on at least one end of the keycap 114. Each of the slide bearings 116 can have a recess 162 with a protrusion 160 configured to be received in an openings 156 in the keycap 114. To secure the slide bearings 116 to the keycap 114, adhesive, such as is represented by the adhesive layer 118, can be applied.

Figure 8:
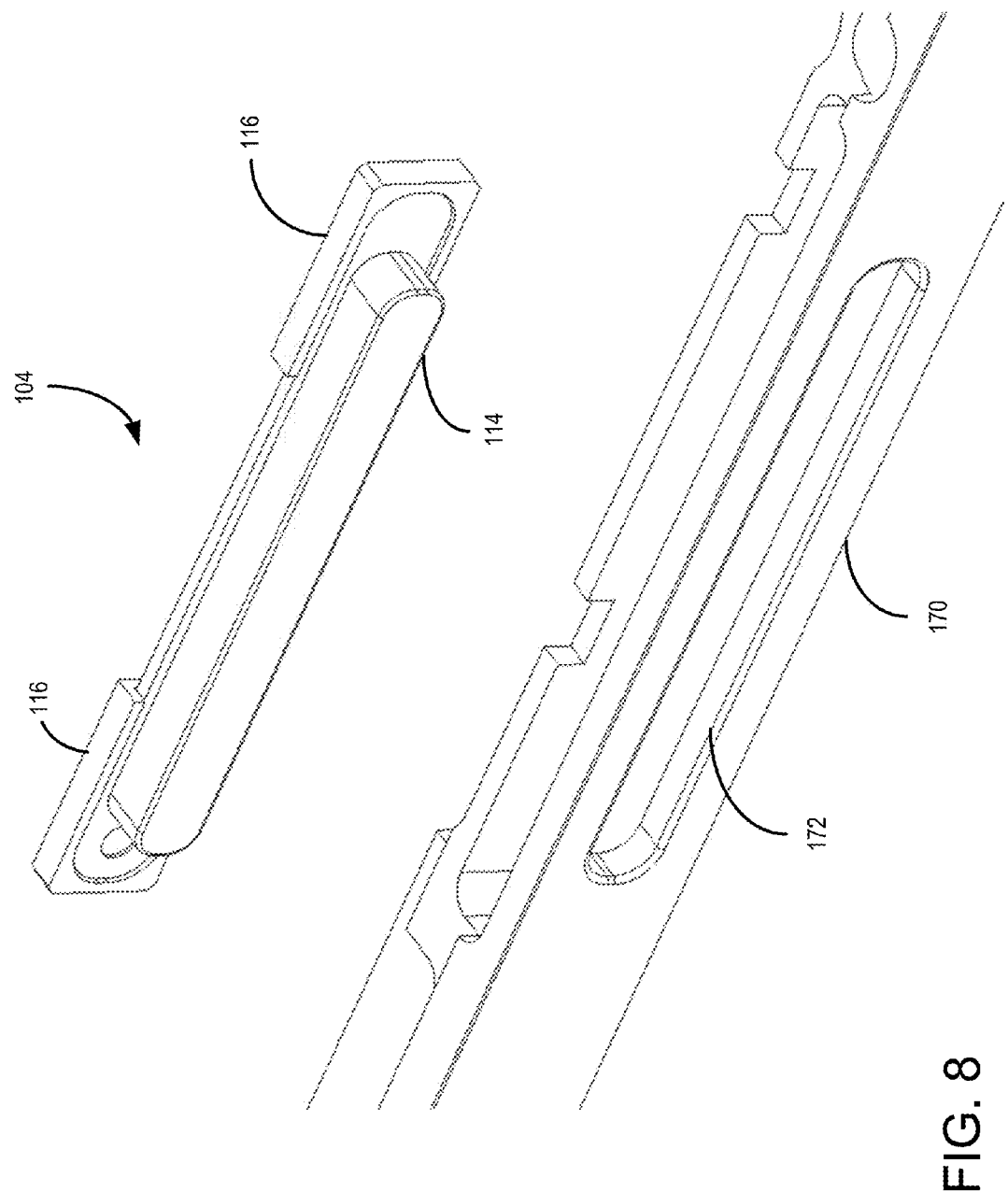
FIG. 8 is a perspective view of the keycap assembly being assembled into the housing of an electronic device.

FIG. 8 is a perspective view showing the keycap assembly 104 being positioned into its assembled position so that the raised portion 150 will protrude through an opening 172 in a housing of the electronic device. FIG. 9 is a perspective view showing the keycap assembly 104 in place within the opening 172 and the FPC assembly 102 being inserted into a recess 174 with the spring elements 120 received in notches 176.

Figure 10:
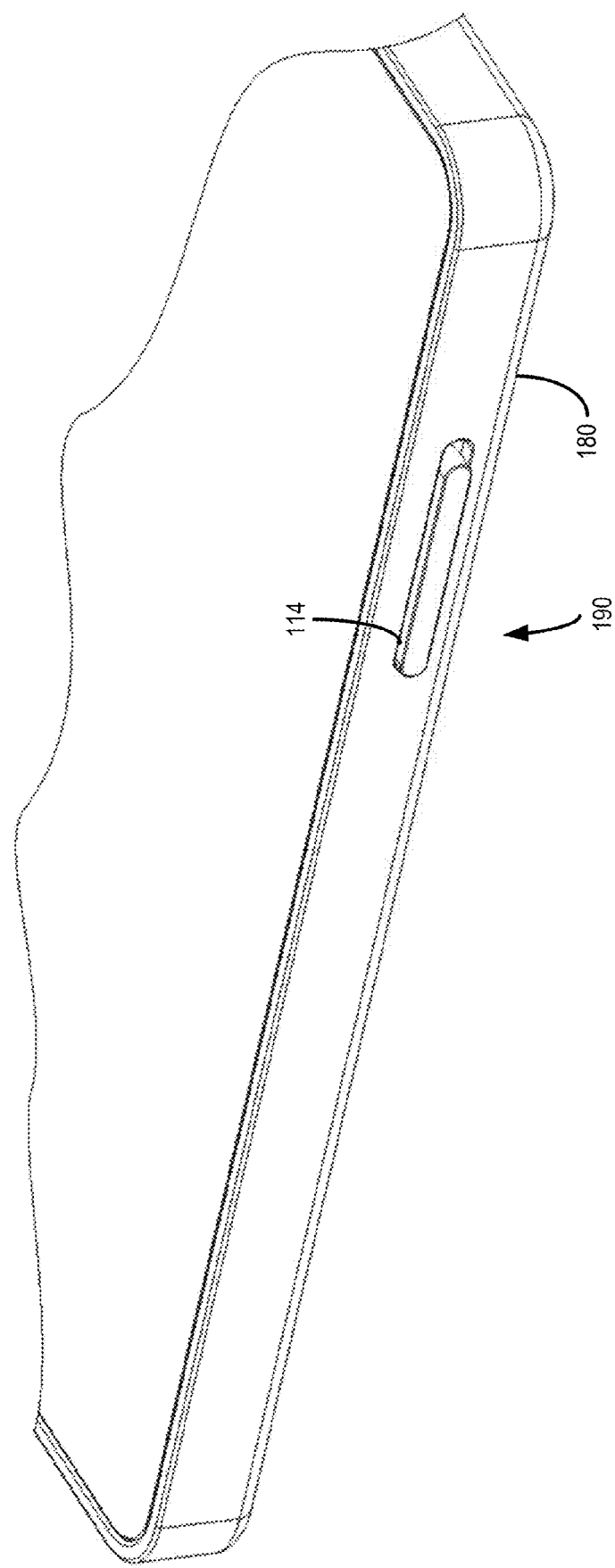
FIG. 10 is a partial perspective view of a mobile device with a two-mode switch assembly in a first position.
Figure 11:
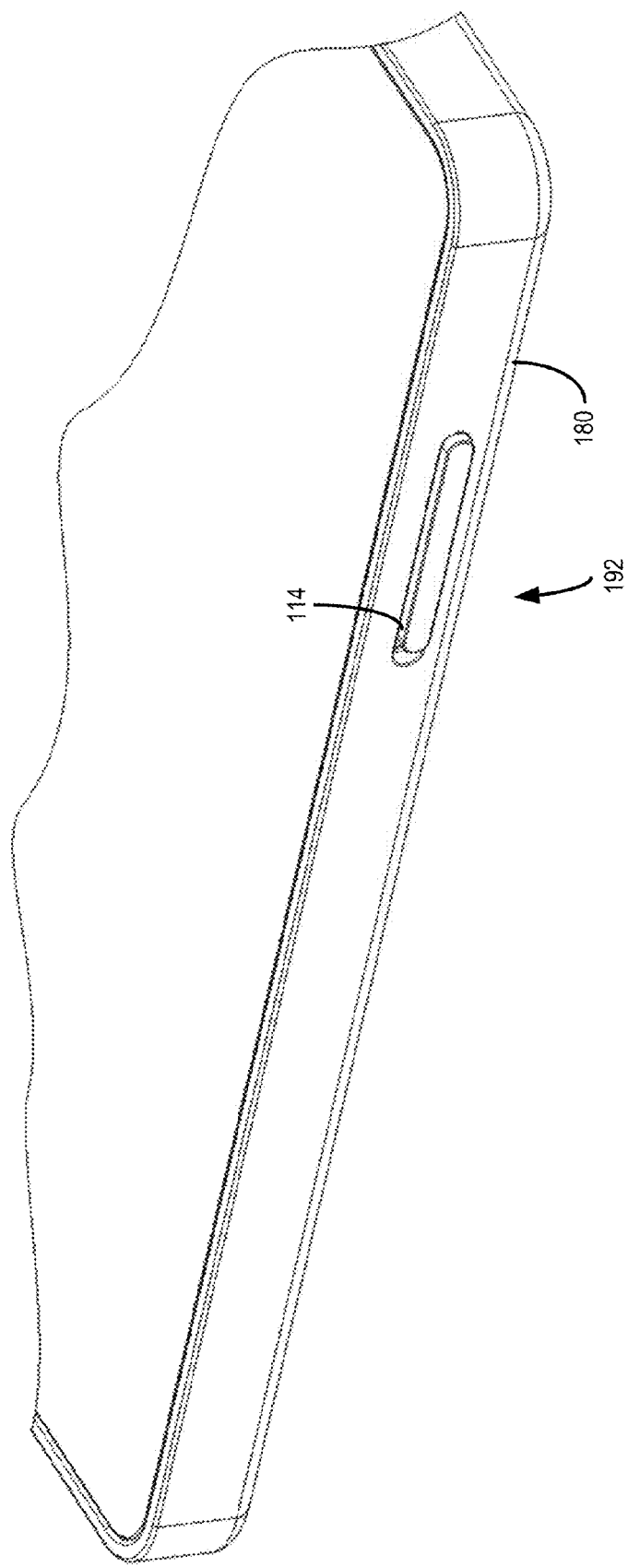
FIG. 11 is a partial perspective view of the mobile device of FIG. 10 with the two-mode switch in a second position.

In an exemplary implementation for an electronic device 180, the keycap 114 can be slid between a first position 190 as shown in FIG. 10 and a second position 192 as shown in FIG. 11. The first position 190 of the keycap 114 corresponds to a muted audio mode, and the second position 192 corresponds to an unmuted audio mode. Of course, the switch assembly 100 could be provided with greater than two positions, and it can be configured as a control for functions other than audio muting.

According to one approach, when the keycap 114 is in the second (unmuted) position 192, either end of the raised portion 150 can be depressed or rocked to activate a corresponding one of the switches 110. For example, depressing or rocking one end of the raised portion 150 can be used to increase the volume level, and depressing or rocking the opposite end of the raised portion 150 can be used to decrease the volume level. Thus, a dual-mode operation is achieved with a single switch assembly. When the keycap 114 is in the first (muted) position 190, the raised portion 150 is prevented from being depressed or rocked (or the switch assembly is configured so that such action has no effect). In this way, the user learns that the volume level can be increased or decreased only when the keycap 114 is in the unmuted position, and not while the keycap 114 is in the muted position.

According to another approach, the raised portion 150 can be depressed or rocked while the keycap 114 is in the first position or the second position. Depressing or rocking the keycap 114 in the first position, i.e., while the audio mode is muted in this example, can be assigned to a different control functionality, such as changing the level of brightness or flash rate on visual alerts used when the device's audio output is muted.

Figure 12:
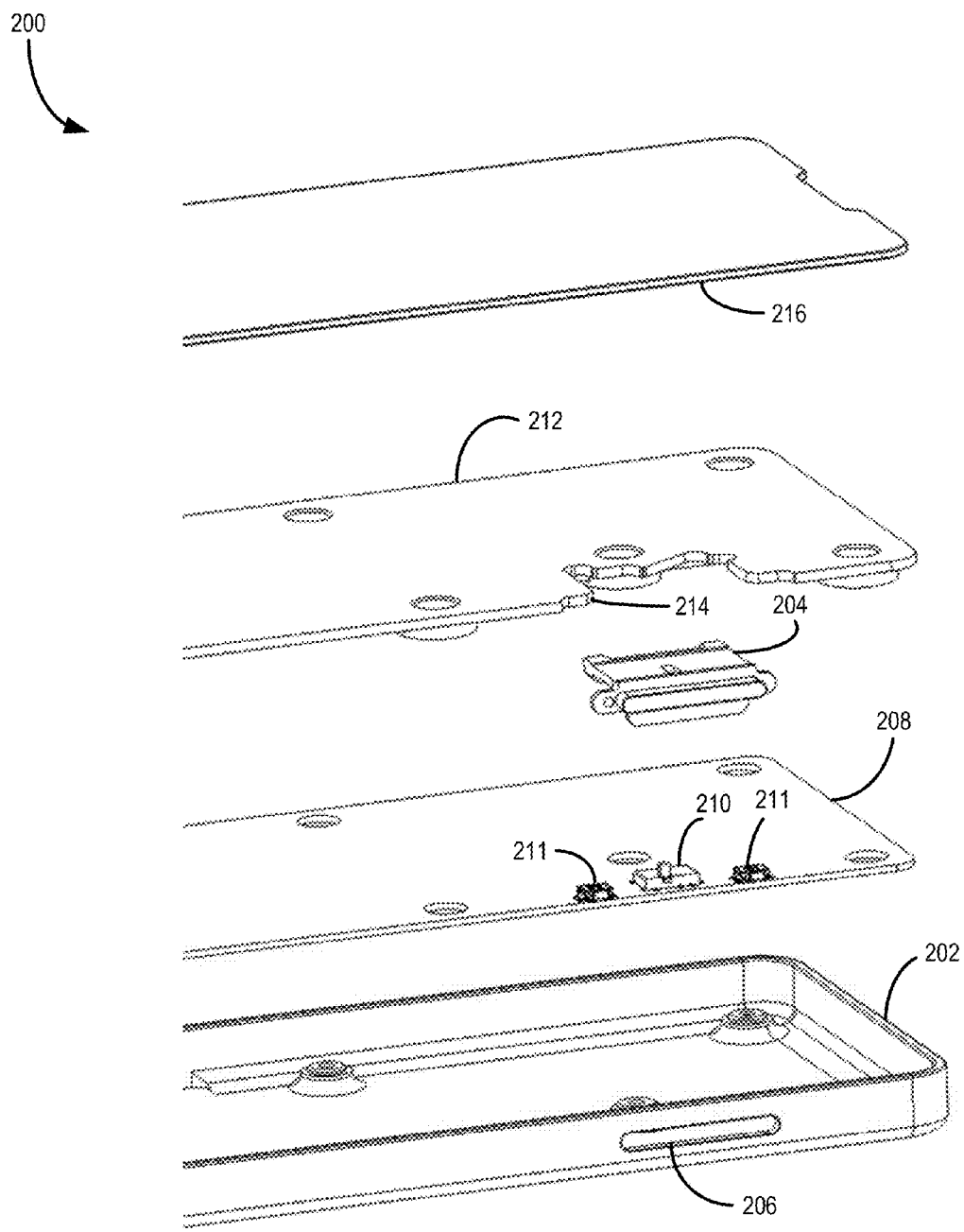
FIG. 12 is an exploded perspective view of the mobile device of FIGS. 10 and 11.

FIG. 12 is an exploded perspective view of an exemplary mobile device 200 having a two-mode switch 201 according to a different implementation. As indicated, there is a housing or chassis 202 shaped to receive a PCB assembly 208. A slide switch 210 is stationarily mounted to PCB assembly 208. A pair of surface mount switches 211 are mounted on either side of the slide switch 208. A locking keycap 204 is configured to be coupled with the slide switch 210 and to translate within a recess 214 formed in a midframe 212. The midframe 212 is covered by a lens 216 that forms an upper surface of the mobile device 200.

Figure 13:
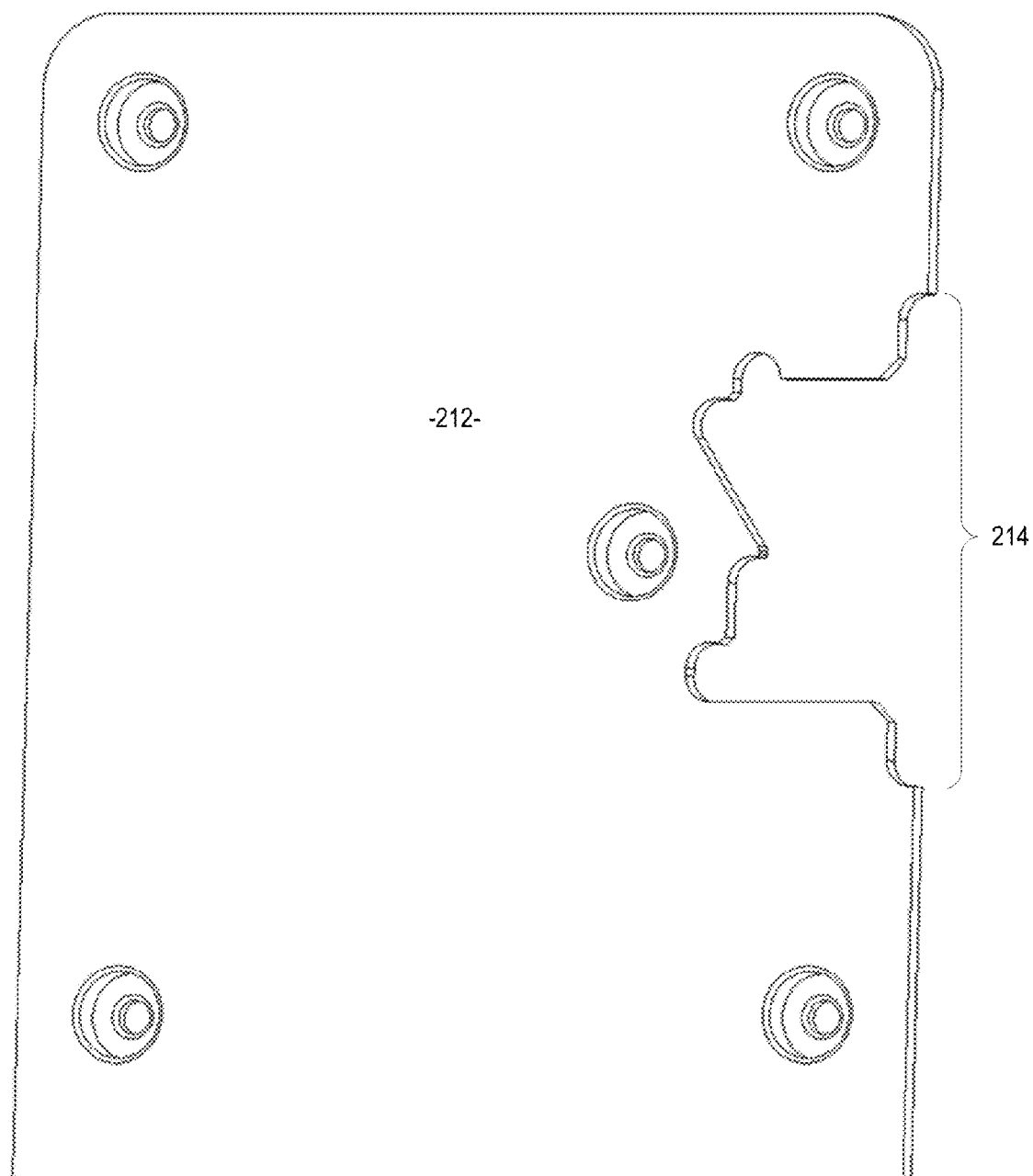
FIG. 13 is a perspective view of a portion of the midframe component of FIG. 12.
Figure 14:
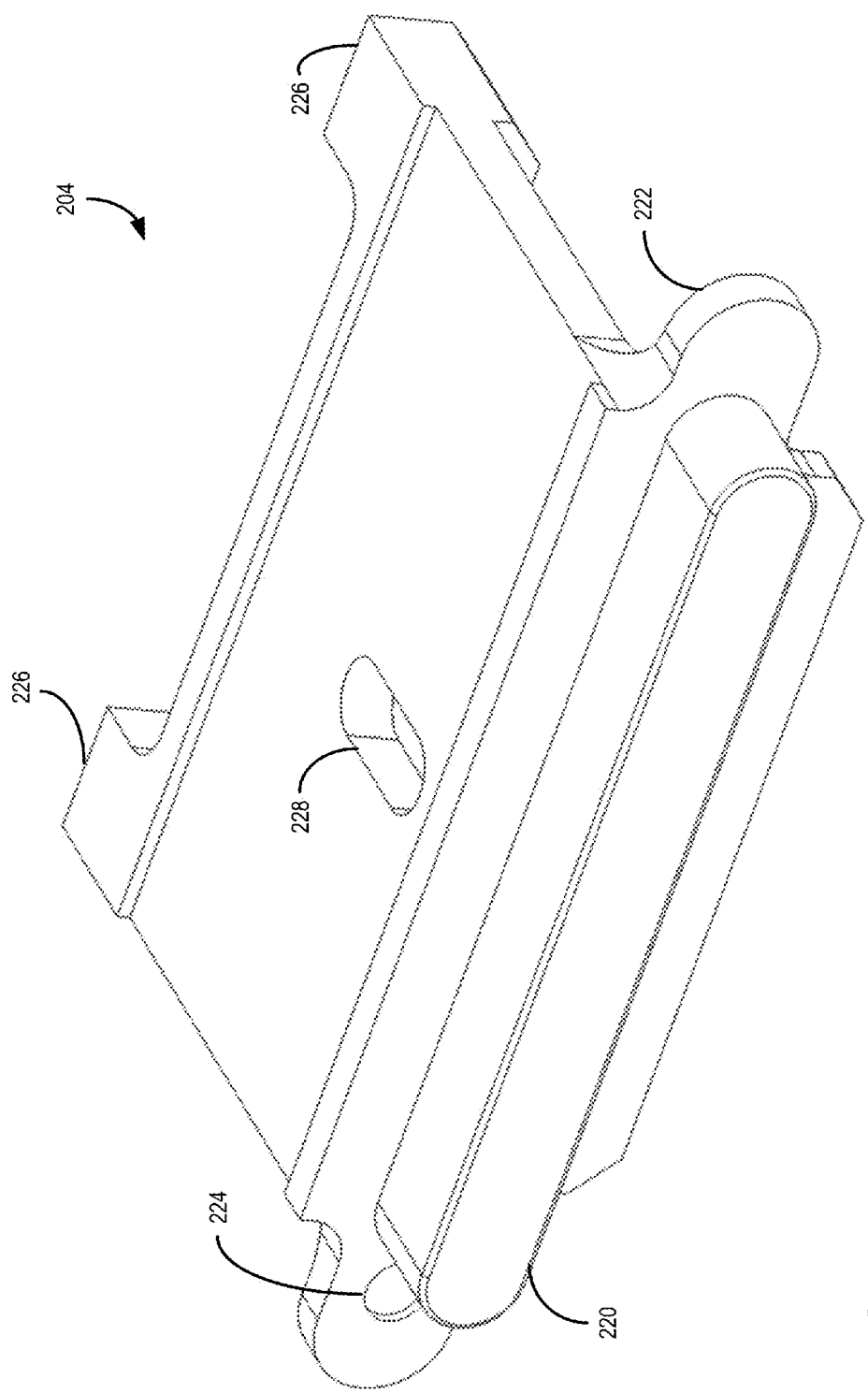
FIGS. 14 and 15 are perspective views of two different keycaps that can be used in the mobile device of FIGS. 10 and 11.
Figure 16A:
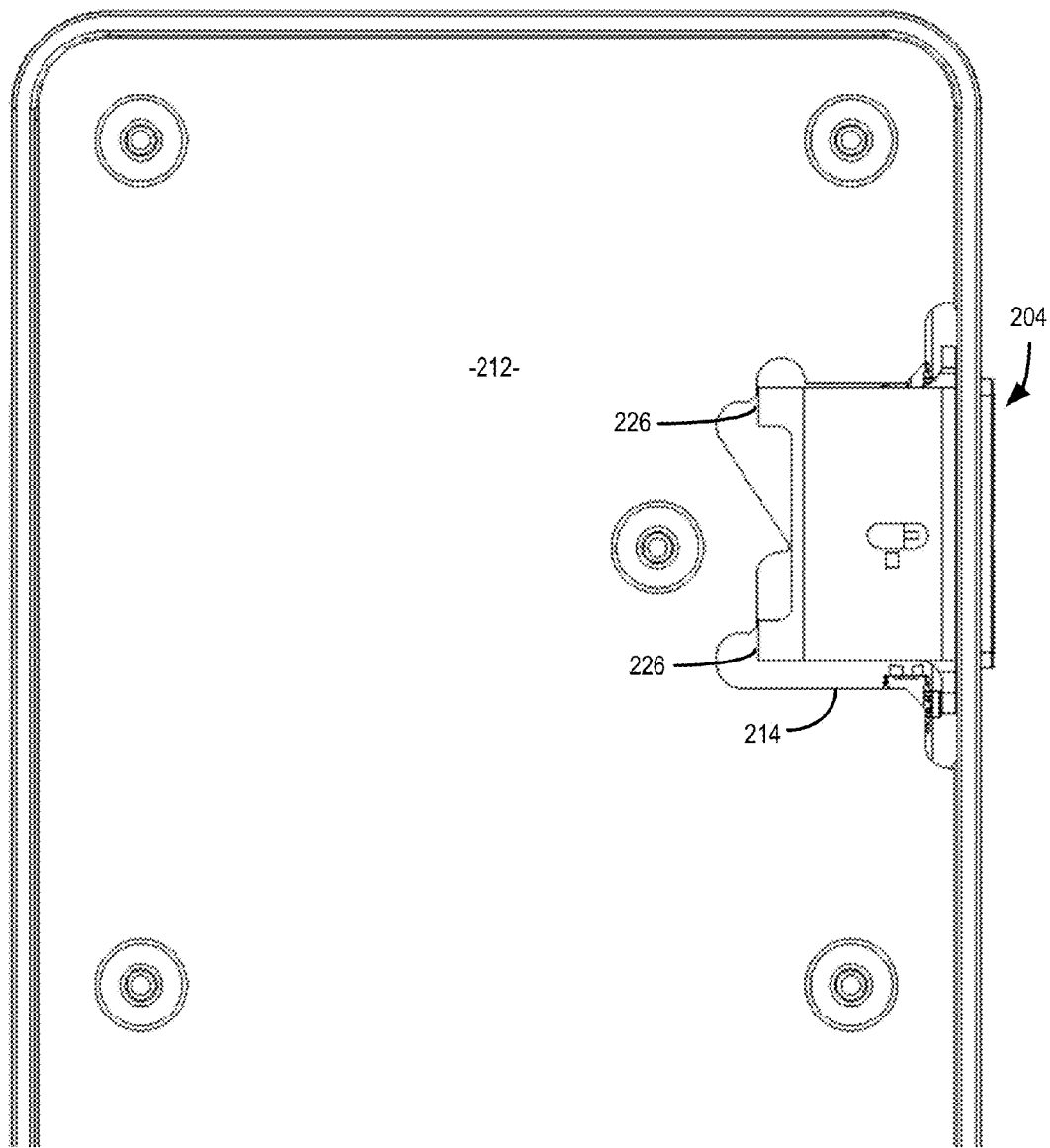
FIGS. 16a and 16b are plan views of a portion of the midframe showing the keycap in two different positions.
Figure 16B:
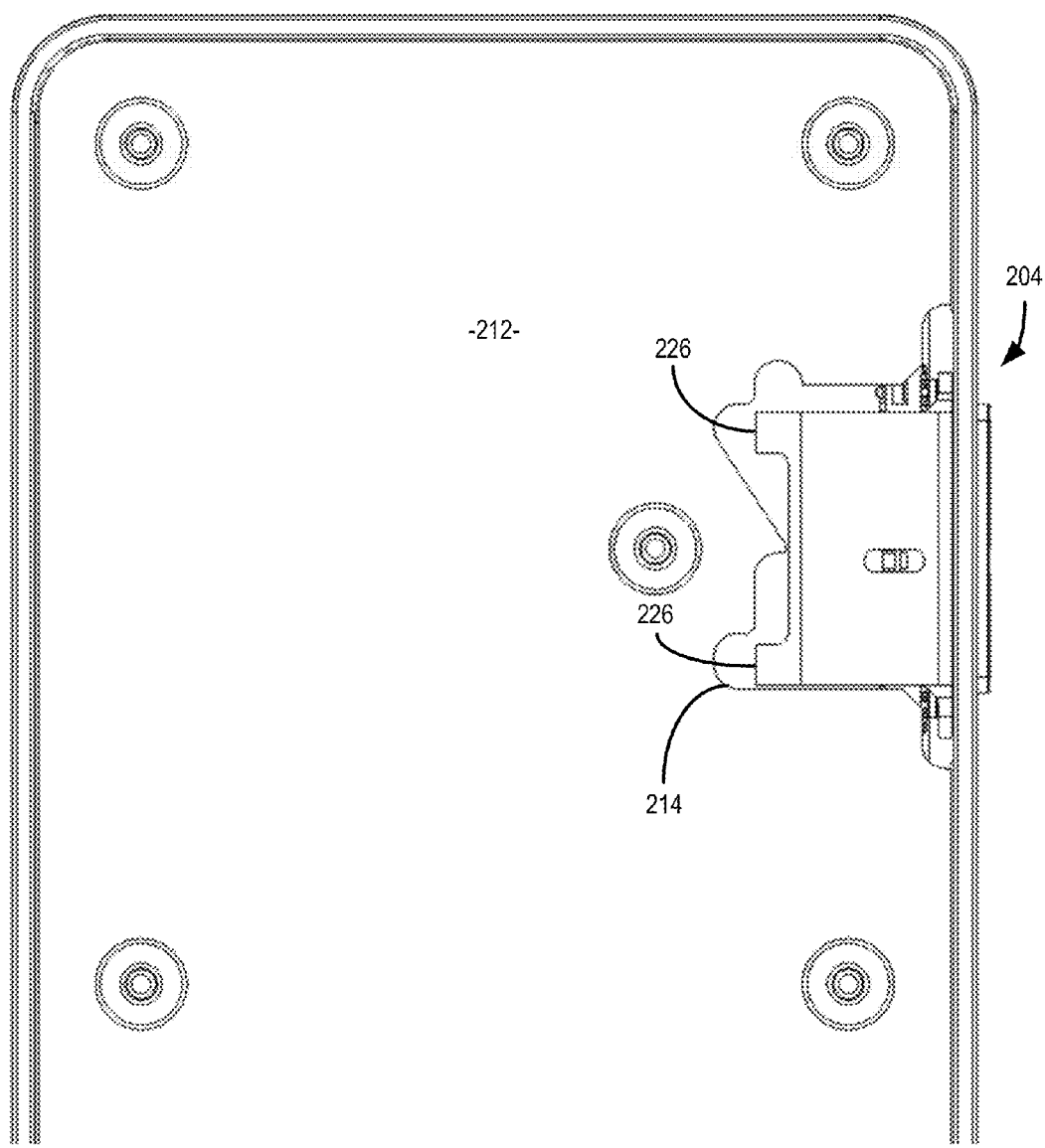

FIG. 13 is an enlarged perspective view showing the recess 214 in the midframe 212. FIG. 14 is an enlarged perspective view of the locking keycap 204. The locking keycap 204 has a raised portion 220, a surrounding flange 222, an indicator 224, tabs 226 and a slot 228. FIG. 16a shows the locking keycap 204 in a first position where the keycap is locked or prevented from being depressed or rocked because the tabs 226 are in contact with the midframe 212. In contrast, FIG. 16b shows the locking keycap 204 in a second position where the keycap 204 can be rocked or depressed, such as by applying pressure to either end of the raised portion 220. As can be seen, the keycap 204 can pivot about its point contact with the midframe 212, and the tabs 226 have space to move.

Figure 15:
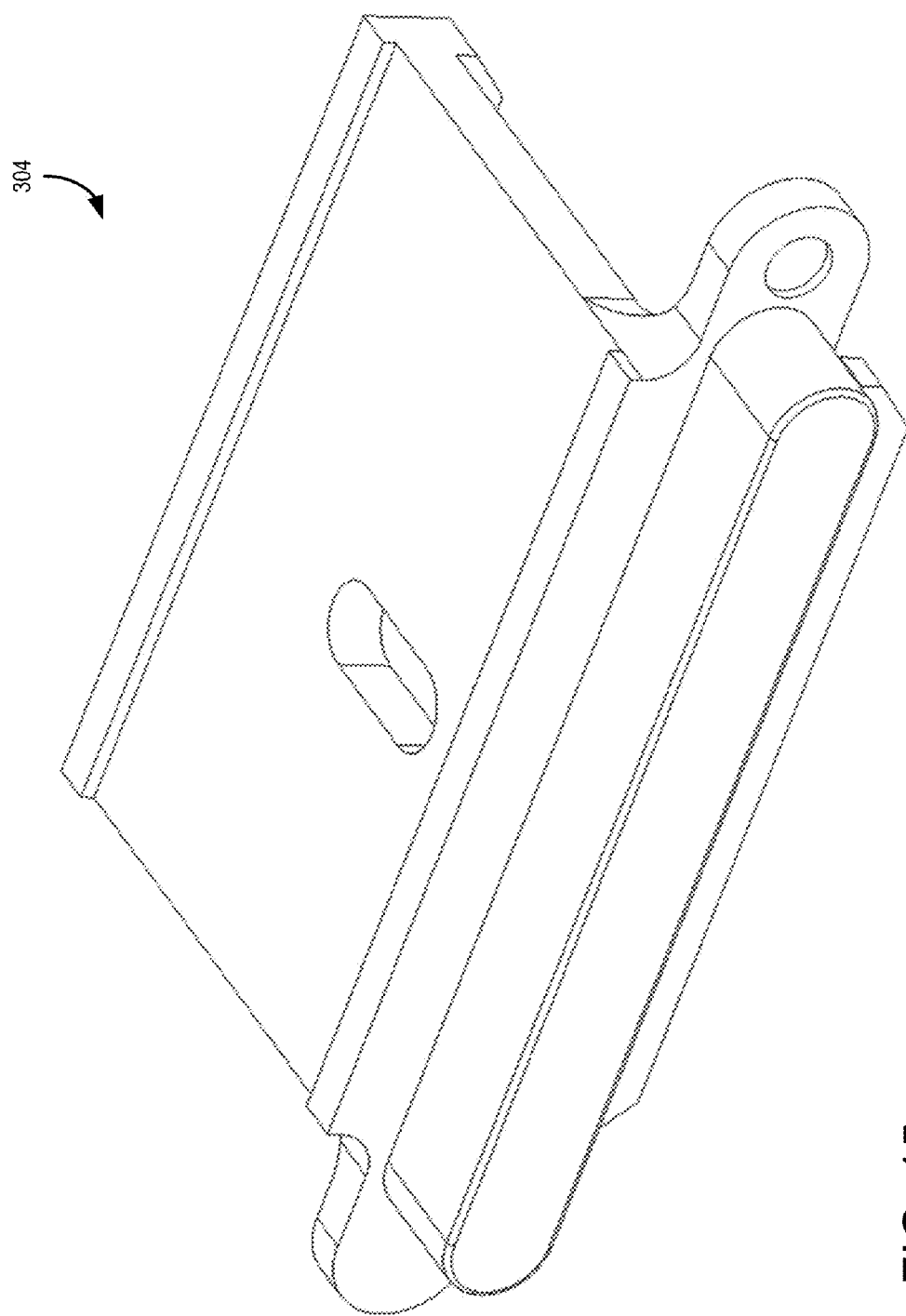

FIG. 15 is a perspective view of a non-locking keycap 304. The non-locking keycap 304 allows for the raised portion to be depressed or rocked while the keycap 304 is in either the first position or the second position within the recess 214. As can be seen, the tabs 226 have been eliminated, so there is no interference to motion when the keycap 304 is in the first position of FIG. 16a.

Figure 17:
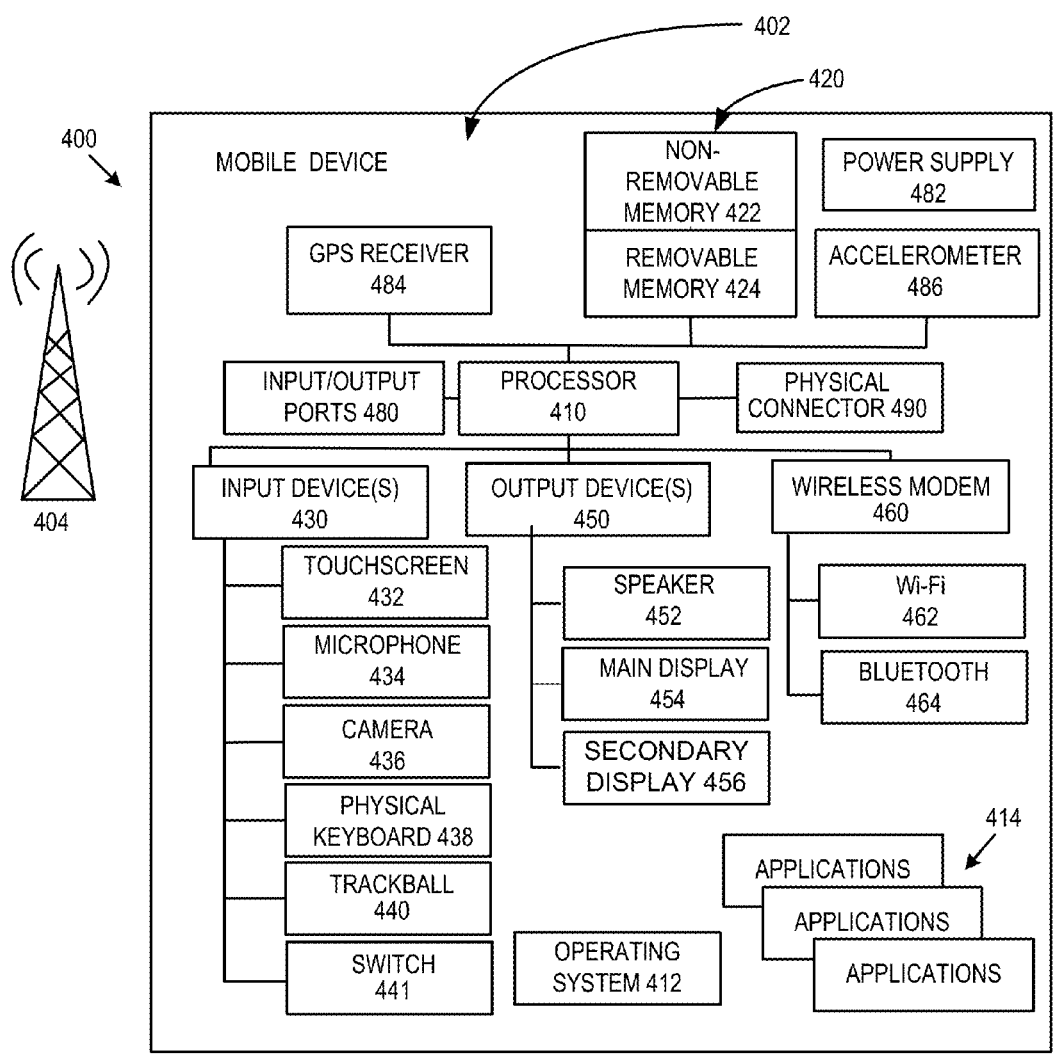
FIG. 17 is a schematic diagram depicting an exemplary mobile device with which any of the disclosed implementations can be used.

FIG. 17 is a system diagram depicting an exemplary mobile device 400 including a variety of optional hardware and software components, shown generally at 402. Any components 402 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 404, such as a cellular or satellite network.

The illustrated mobile device 400 can include a controller or processor 410 (e.g., signal processor, microprocessor, ASIC, or other control and processing logic circuitry) for performing such tasks as signal coding, data processing, input/output processing, power control, and/or other functions. An operating system 412 can control the allocation and usage of the components 402 and support for one or more application programs 414. The application programs can include common mobile computing applications (e.g., email applications, calendars, contact managers, web browsers, messaging applications), or any other computing application.

The illustrated mobile device 400 can include memory 420. Memory 420 can include non-removable memory 422 and/or removable memory 424. The non-removable memory 422 can include RAM, ROM, flash memory, a hard disk, or other well-known memory storage technologies. The removable memory 424 can include flash memory or a Subscriber Identity Module (SIM) card, which is well known in GSM communication systems, or other well-known memory storage technologies, such as "smart cards." The memory 420 can be used for storing data and/or code for running the operating system 412 and the applications 414. Example data can include web pages, text, images, sound files, video data, or other data sets to be sent to and/or received from one or more network servers or other devices via one or more wired or wireless networks. The memory 420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 400 can support one or more input devices 430, such as a touchscreen 432, microphone 434, camera 436, physical keyboard 438, trackball 440, any of the described switches 441 (including, e.g., a dual-mode switch), and one or more output devices 450, such as a speaker 452, a main display 454, and/or one or more secondary displays 456. Other possible output devices (not shown) can include piezoelectric or other haptic output devices. Some devices can serve more than one input/output function. For example, touchscreen 432 and displays 454, 456 can be combined in a single input/output device. The input devices 430 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 412 or applications 414 can comprise speech-recognition software as part of a voice user interface that allows a user to operate the device 400 via voice commands. Further, the device 400 can comprise input devices and software that allows for user interaction via a user's spatial gestures, such as detecting and interpreting gestures to provide input to a gaming application.

A wireless modem 460 can be coupled to an antenna (not shown) and can support two-way communications between the processor 410 and external devices, as is well understood in the art. The modem 460 is shown generically and can include a cellular modem for communicating with the mobile communication network 404 and/or other radio-based modems (e.g., Bluetooth 464 or Wi-Fi 462). The wireless modem 460 is typically configured for communication with one or more cellular networks, such as a GSM network for data and voice communications within a single cellular network, between cellular networks, or between the mobile device and a public switched telephone network (PSTN).

The mobile device can further include at least one input/output port 480, a power supply 482, a satellite navigation system receiver 484, such as a Global Positioning System (GPS) receiver, an accelerometer 486, and/or a physical connector 490, which can be a USB port, IEEE 1394 (FireWire)

port, and/or RS-232 port. The illustrated components 402 are not required or all-inclusive, as any components can be deleted and other components can be added.

Figure 18:
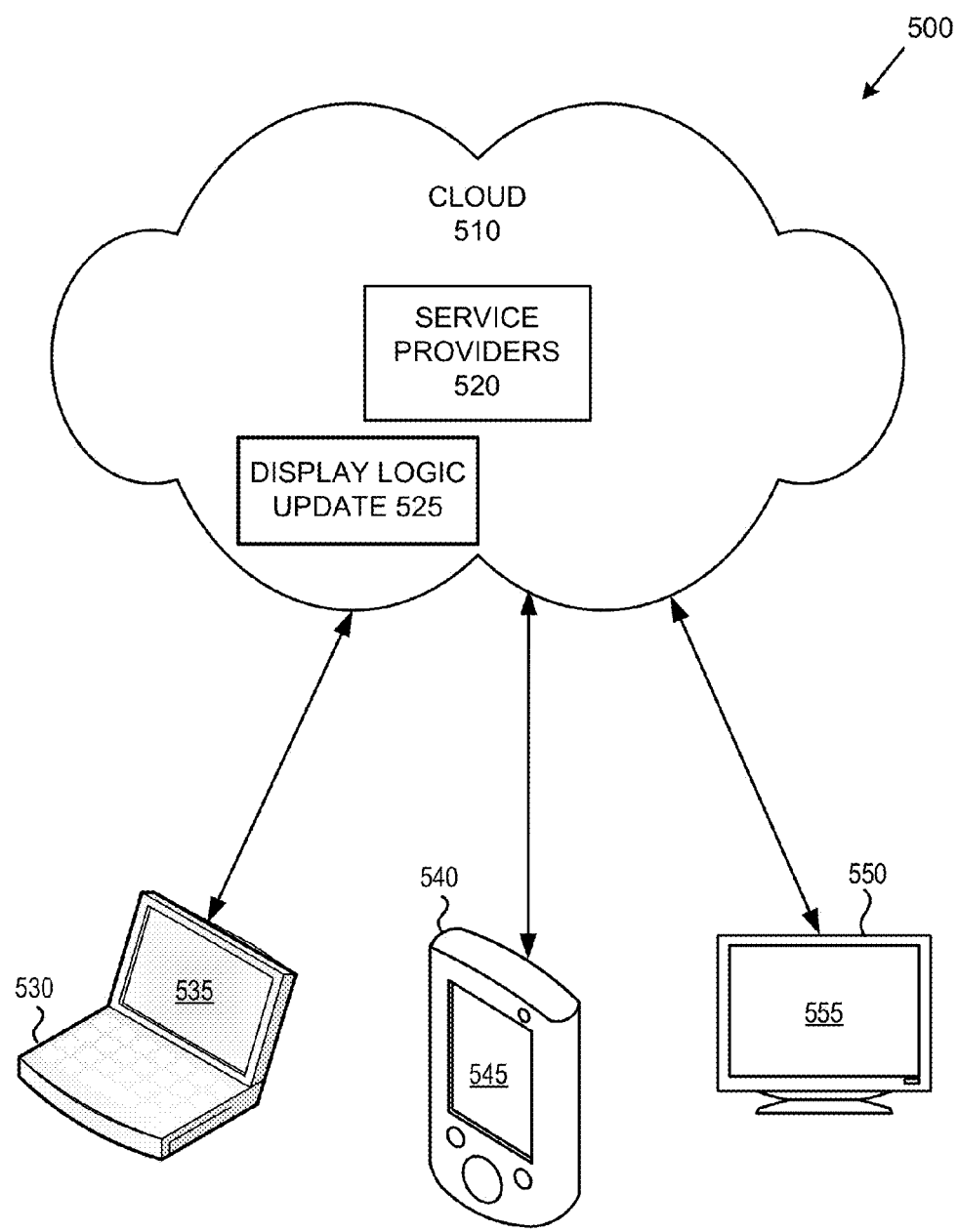
FIG. 18 is a schematic diagram illustrating a generalized example of a suitable implementation environment.

FIG. 18 illustrates a generalized example of a suitable implementation environment 500 in which described embodiments, techniques, and technologies may be implemented.

In example environment 500, various types of services (e.g., computing services) are provided by a cloud 510. For example, the cloud 510 can comprise a collection of computing devices, which may be located centrally or distributed, that provide cloud-based services to various types of users and devices connected via a network such as the Internet. The implementation environment 500 can be used in different ways to accomplish computing tasks. For example, some tasks (e.g., processing user input and presenting a user interface) can be performed on local computing devices (e.g., connected devices 530, 540, 550) while other tasks (e.g., storage of data to be used in subsequent processing) can be performed in the cloud 510.

In example environment 500, the cloud 510 provides services for connected devices 530, 540, 550 with a variety of screen capabilities. Connected device 530 represents a device with a computer screen 535 (e.g., a mid-size screen). For example, connected device 530 could be a personal computer such as desktop computer, laptop, notebook, netbook, or the like. Connected device 540 represents a device with a mobile device screen 545 (e.g., a small size screen). For example, connected device 540 could be a mobile phone, smart phone, personal digital assistant, tablet computer, or the like. Connected device 550 represents a device with a large screen 555. For example, connected device 550 could be a television screen (e.g., a smart television) or another device connected to a television (e.g., a set-top box or gaming console) or the like. One or more of the connected devices 530, 540, 550 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 500. For example, the cloud 510 can provide services for one or more computers (e.g., server computers) without displays.

Services can be provided by the cloud 510 through service providers 520, or through other providers of online services (not depicted). For example, cloud services can be customized to the screen size, display capability, and/or touchscreen capability of a particular connected device (e.g., connected devices 530, 540, 550). In some embodiments, connected devices having more than one display can communicate with the cloud 510 to receive updates 525 and/or changes to their display logic, such as the change way in which the different screens are used to perform various functions.

In example environment 500, the cloud 510 provides the technologies and solutions described herein to the various connected devices 530, 540, 550 using, at least in part, the service providers 520. For example, the service providers 520 can provide a centralized solution for various cloud-based services. The service providers 520 can manage service subscriptions for users and/or devices (e.g., for the connected devices 530, 540, 550 and/or their respective users).

Figure 19:
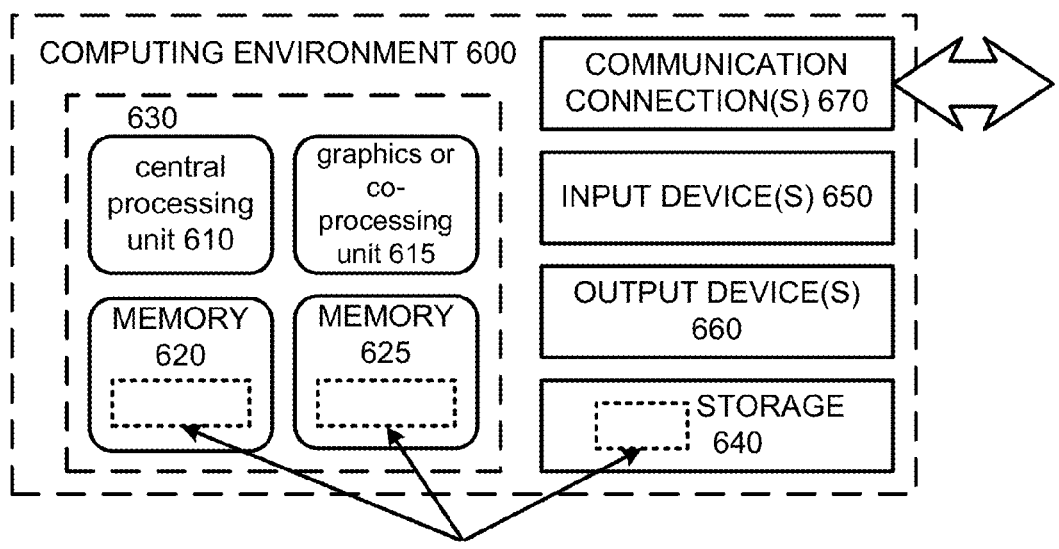
FIG. 19 is a schematic diagram illustrating a generalized example of a suitable computing environment in which the disclosed implementations may be used.

FIG. 19 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, media player, gaming system, mobile device, etc.)

With reference to FIG. 19, the computing environment 600 includes one or more processing units 610, 615 and memory 620, 625. In FIG. 19, this basic configuration 630 is included within a dashed line. The processing units 610, 615 execute computer-executable instructions. A processing unit can be a general-purpose central processing unit (CPU), a graphics processing unit (GPU), a processor in an application-specific integrated circuit (ASIC), or any other type of processor. In a multi-processing system, multiple processing units execute computer-executable instructions to increase processing power. For example, FIG. 19 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 in the form of computer-executable instructions suitable for execution by the processing unit(s).

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other storage device which can be used to store information and which can be accessed within the computing environment 600. The storage 640 stores instructions for the software 680.

The input device(s) 650 may be a touch input device such as a touchscreen, keyboard, switch, mouse, pen or trackball, a voice input device, a scanning device, or another device that provides input to the computing environment 600. For video encoding, the input device(s) 650 may be a camera, video card, TV tuner card, or similar device that accepts video input in analog or digital form, or a CD-ROM or CD-RW that reads video samples into the computing environment 600. The output device(s) 660 may be one or more displays, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones, tablets, or other mobile devices that include computing hardware). As should be readily understood, the term computer-readable storage media does not include communication connections, such as modulated data signals. Any of the computer-executable instructions for implementing the disclosed techniques as well as any data created and used during implementation of the disclosed embodiments can be stored on one or more computer-readable media (which excludes propagated signals). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles disclosed herein may be applied, it should be recognized that the illustrated embodiments are only preferred examples and should not be taken as limiting the scope of the disclosure. Rather, the scope of the disclosure is defined by the following claims. We therefore claim all that comes within the scope of these claims.

I claim:

1. A switch assembly for an electronic device, comprising:
 a switch mount having a slide switch with a slide switch base, a slide switch actuator and first and second contact switches; and
 a keycap positionable in a recess of the device for slidable movement relative to the switch mount, the keycap being coupleable to the slide switch actuator and having an exposed portion, first and second ends and an extension, wherein the exposed portion is slidable between at least a first position and a second position and the first and second ends are alignable with the first and second contact switches, and wherein the extension is shaped to extend interiorly into the recess of the device for positioning against a pivot point defined in the recess, and
 wherein, in at least one of the first or second positions, the keycap is rockable by a user against the action of first and second spring portions to actuate the first and second contact switches, respectively, as the extension contacts and pivots relative to the pivot point, thereby executing a control function.

2. The switch assembly of claim 1, wherein the keycap is shaped for positioning the exposed portion to protrude through an opening in a housing of the electronic device.

3. The switch assembly of the claim 1, wherein the switch mount comprises a flexible circuit component shaped for electrically connecting the slide switch to a circuit of the electronic device.

4. The switch assembly of claim 3, wherein the first and second contact switches are connected to the flexible circuit component, and wherein the slide switch is positioned between the first and second contact switches.

5. The switch assembly of claim 1, wherein the exposed portion of the keycap comprises a visual indicator in at least one of the first position or the second position.

6. The switch assembly of claim 1, wherein the keycap comprises bearings positionable in sliding contact with the switch mount.

7. A mobile device, comprising:
 a dual-mode switch with a switch member configured to slide between at least a first position and a second position to execute a first mute control function, wherein when the switch member is in the first position, selected audio output of the mobile device is muted, and when the switch member is in the second position, the selected audio output is unmuted,
 wherein the switch member is rockable in only one of the first and second positions to execute a second volume level control function, and wherein the switch member has an extension portion for positioning to extend into the mobile device and configured to mechanically block the switch member from being rockable in the other of the first and second positions.

8. The switch assembly of claim 1, wherein the electronic device is a mobile device, and wherein a first switch function is a mute control and a second switch function is a volume level control.

9. The switch assembly of claim 1, wherein the slide switch actuator is slidable in a first plane and the exposed portion of the keycap is slidable in a second plane transverse to the first plane.

10. The switch assembly of claim 1, wherein the extension of the key cap comprises a transverse slot shaped to receive the slide switch actuator.

\* \* \* \* \*